US007864703B2

(12) United States Patent
Sumiyoshi et al.

(10) Patent No.: US 7,864,703 B2
(45) Date of Patent: Jan. 4, 2011

(54) PACKET COMMUNICATION DEVICE

(75) Inventors: Takashi Sumiyoshi, Kokubunji (JP);
Toshiaki Suzuki, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 596 days.

(21) Appl. No.: 11/489,667

(22) Filed: Jul. 20, 2006

(65) Prior Publication Data

US 2007/0047468 A1 Mar. 1, 2007

(30) Foreign Application Priority Data

Aug. 31, 2005 (JP) ............................. 2005-251286

(51) Int. Cl.
*H04L 12/28* (2006.01)
(52) U.S. Cl. .................................... 370/254
(58) Field of Classification Search ................. 370/299, 370/401, 392, 254
See application file for complete search history.

(56) References Cited

U.S. PATENT DOCUMENTS

| 6,160,811 | A  | * | 12/2000 | Partridge et al. | ............ 370/401 |
| 7,298,752 | B2 | * | 11/2007 | Moriwaki et al. | ........... 370/401 |
| 7,443,868 | B2 | * | 10/2008 | Suzuki et al.    | ............... 370/401 |
| 2003/0161319 | A1 |   | 8/2003 | Okagawa et al.  | |
| 2004/0008687 | A1 | * | 1/2004 | Matsubara | ............. 370/395.21 |
| 2004/0184453 | A1 |   | 9/2004 | Moriwaki et al. | |
| 2004/0190466 | A1 | * | 9/2004 | Jones et al. | .................. 370/299 |
| 2005/0068910 | A1 | * | 3/2005 | Sandy et al. | ................. 370/299 |
| 2006/0002298 | A1 |   | 1/2006 | Suzuki et al. | |

FOREIGN PATENT DOCUMENTS

| JP | 2003-258842 | 9/2003 |
| JP | 2004-289223 | 10/2004 |

OTHER PUBLICATIONS

Cisco Catalyst 6500 Series switches http://www.cisco.com/japanese/warp/public/3/jp/product/hs/switches/cat6500/index.shtml(Cisco Catalyst 6500) (http://www.cisco.com/en/US/products/hw/switches/ps708/index.html).

* cited by examiner

*Primary Examiner*—Derrick W Ferris
*Assistant Examiner*—Mohammad Anwar
(74) *Attorney, Agent, or Firm*—Mattingly & Malur, P.C.

(57) ABSTRACT

A packet communication device, which provides a modular node capable of setting up the operation of the node at a time without updating a program in the node body when a new functional module is installed, sends a process setting content, requested by a configuration file specified by a manager, to functional modules as an offering message and determines whether or not the functional modules can process the content of the offering message. Based on the answers of offering, a configuration processing program of a node determines a functional module, to which processing it to be assigned, according to a predetermined method.

17 Claims, 19 Drawing Sheets

FIG. 7

```
<?xml version="1.0"?>
<config>
  <flowblock>
    <flow>
      <ipdst address="192.168.100.0"
             netmask="255.255.255.0"/>
      <ipproto protonum="89"/>
    </flow>
    <action functype="OSPF">
      <hello-interval>200</hello-interval>
      <area>
        <subnet>172.16.178.0/24</subnet>
        <interface>172.16.178.1</interface>
      </area>
    </action>
    <action functype="IPSEC">
      <mode>encrypt:3DES</mode>
      <throughput>10Mbps</throughput>
    </action>
  </flowblock>
</config>
```

| REQUESTED PROCESS ID | AVAILABLE FUNCTIONAL MODULE INTERFACE No. | ASSIGNED FUNCTIONAL MODULE INTERFACE No. |
|---|---|---|
| 1 | 1 | 1 |
| 2 | 3,4 | 3 |
| ⋮ | ⋮ | ⋮ |

PACKET COMMUNICATION DEVICE

INCORPORATION BY REFERENCE

The present application claims priority from Japanese application JP 2005-251286 filed on Aug. 31, 2005, the content of which is hereby incorporated by reference into this application.

BACKGROUND OF THE INVENTION

The present invention relates to a packet communication device, and more particularly to a modular packet communication device that performs various types of routing and switching for layer 2 or higher layers of the OSI reference model in a packet exchange network.

As a packet communication device designed for function expansion, a modular packet communication device with an interface, which allows a functional module to be added later as an additional function, is known. Such modular packet communication devices are disclosed in JP-A-2003-258842, JP-A-2004-289223, and http://www.cisco.com/japanese/warp/public/3/jp/product/hs/switches/cat6500/index.shtml (Cisco Catalyst 65000). The modular packet communication device disclosed in JP-A-2003-258842 and JP-A-2004-289223 has multiple interfaces to which high efficiency processing units (functional modules) can be connected. In this module packet communication device, the transfer paths among the functional modules in the packet communication device are determined according to a manager-specified correspondence between the reception packet conditions and the processing for the packets and, based on those transfer paths, packet processing is performed by the functional modules. In addition, JP-A-2004-289223 discloses a modular packet communication device that expands the function by connecting multiple functional modules, each capable of providing the same function, and by distributing packets evenly among those functional modules for achieving processing load sharing.

In general, when a packet communication network is built, the manager sets the packet transfer method and the packet processing method (configuration definition) in the packet communication devices in the packet communication network. More specifically, the manager uses the CLI (Command Line Interface) or a commercially available management tool to send the configuration definition to the control management unit in the packet communication devices.

In a modular packet communication device, the configuration definition must be set not only in the packet communication device itself but also in the functional modules. For example, a filter rule must be set in the filtering functional module and an encryption method must be set in an encryption functional module. Such a setting content, which must be set for a function provided by a functional module, is called a requested process item. When the manager sends a configuration definition to the node control management unit in the modular packet communication device disclosed in http://www.cisco.com/japanese/warp/public/3/jp/product/hs/switches/cat6500/index.shtml (Cisco Catalyst 65000), the control management unit checks the content of each requested process item in the configuration definition to determine a functional module in which the requested process item is to be set and sets the requested process item in that functional module.

In the description below, a modular packet communication device is simply called a "packet communication device", and the control management unit in the modular packet communication device is called a "module control management unit".

The method used by the module control management unit to select a functional module, in which a requested process item is to be set, depends on the type of a functional module. Because of this, the method disclosed in http://www.cisco.com/japanese/warp/public/3/jp/product/hs/switches/cat6500/index.shtml (Cisco Catalyst 65000) must update the "configuration processing program", which describes the operation of the module control management unit, each time a new functional module is developed. This update work is time-consuming and, if a bug is included in the new program, there is a possibility that the whole processing is stopped.

SUMMARY OF THE INVENTION

In view of the foregoing, it is an object of the present invention to provide a packet communication device that allows a new functional module to be installed without an increase in the work amount and an effect of a bug included in the software even if a new functional module is developed.

To solve the above problem, a packet communication device according to the present invention has a configuration processing program that mainly sends the process contents in a configuration file, received from a manager, to functional modules as an offering message, selects functional modules, to which processing is assigned, based on the answers of offering returned from the functional modules, and requests the selected functional modules to perform processing. In addition, each functional module has a request acceptance program that determines whether or not it is possible to process the process content based on the offering message received from the main part of packet communication device and sends the answer of offering to the main part of packet communication device.

According to the means for solving the problem, the present invention provides a packet communication device that receives a packet over a network and transfers the received packet, comprising:

a network interface that sends or receives the packet to or from the network;

a functional module that performs processing of a specific process content for the packet;

a path retrieving unit that has a path table for obtaining identifiers of the network interface and the functional module and, upon receiving a packet, adds the identifiers, obtained from the path table, to the packet; and a module control management unit that stores configuration information, which describes a condition of a packet to which a process is to be applied and a process content for a packet satisfying the condition and, based on the configuration information, finds and stores an identifier of the functional module that can process the process content, wherein the module control management unit sends the process content, in part or in whole, to the functional module as an offering message, the functional module determines whether or not processing for the process content received from the module control management unit is possible or not and sends an answer of offering to the module control management unit, the module control management unit selects a functional module, to which processing of the process content is to be assigned, based on the answer of offering returned by the functional module and requests the selected functional module to set up for processing, the module control management unit sends a command to the path retrieving unit so that a packet satisfying the condition is sent to one or more of the selected functional modules according to the process content specified by the configuration information, and the path retrieving unit sets the path table according to the command received from the module control management unit.

According to the present invention, whether or not a requested process can be executed is determined, not by the module control management unit of the main part of packet communication device, but by a functional module. Thus, when a new functional module is installed, the functional module can be set up without updating the configuration processing program used by the module control management unit. Therefore, the present invention has an effect of reducing the management load when a new functional module is installed in the packet communication device.

Other objects, features and advantages of the invention will become apparent from the following description of the embodiments of the invention taken in conjunction with the accompanying drawings.

BRIEF DESCRIPTION OF THE DRAWINGS

FIG. 7 is a diagram showing the format of the configuration file supplied to the packet communication device.

DETAILED DESCRIPTION OF THE EMBODIMENTS

In this embodiment, a module control management unit sends configuration information, which describes processing to be executed in a packet communication device, to the functional modules, which send an executable process to the module control management unit. Based on the answer received from the functional modules, the module control management unit performs process setting in the functional modules. This sequence of processing is executed when a functional module is connected to the packet communication device, when the manager updates the configuration information, and when the manager issues a functional module releasing command.

The following describes a packet communication device in the embodiments of the present invention.

1. Configuration

Figure 1:
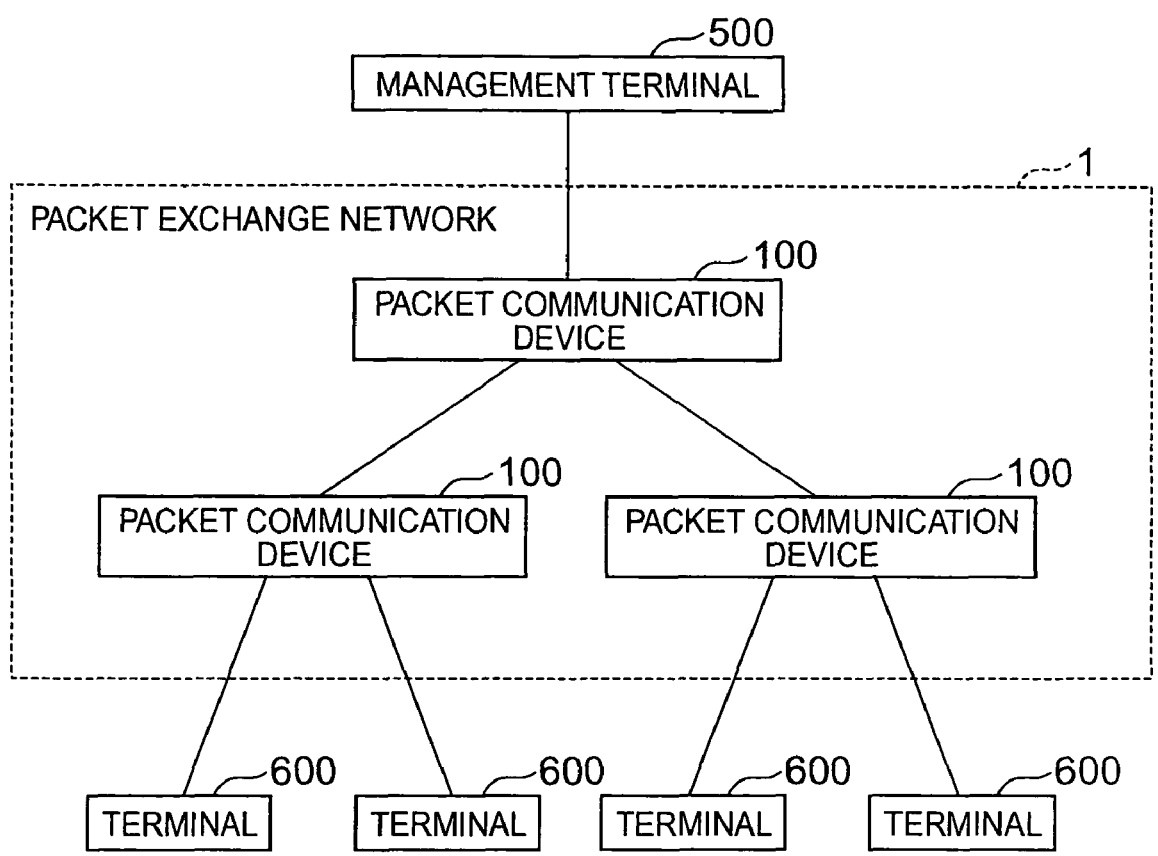
FIG. 1 is a diagram showing the configuration of a network in which a packet communication device is installed.

FIG. 1 is a diagram showing a packet exchange network 1 in which a packet communication device 100 in this embodiment is used.

The packet exchange network 1 comprises multiple packet communication devices 100 interconnected with each other. The user uses the packet exchange network 1 via a terminal 600 connected to the packet communication device 100. A management terminal 500, used by the network manager to manage the packet communication devices 100, is connected either directly, or indirectly via the packet exchange network 1, to the packet communication devices 100 to be managed.

Figure 2:
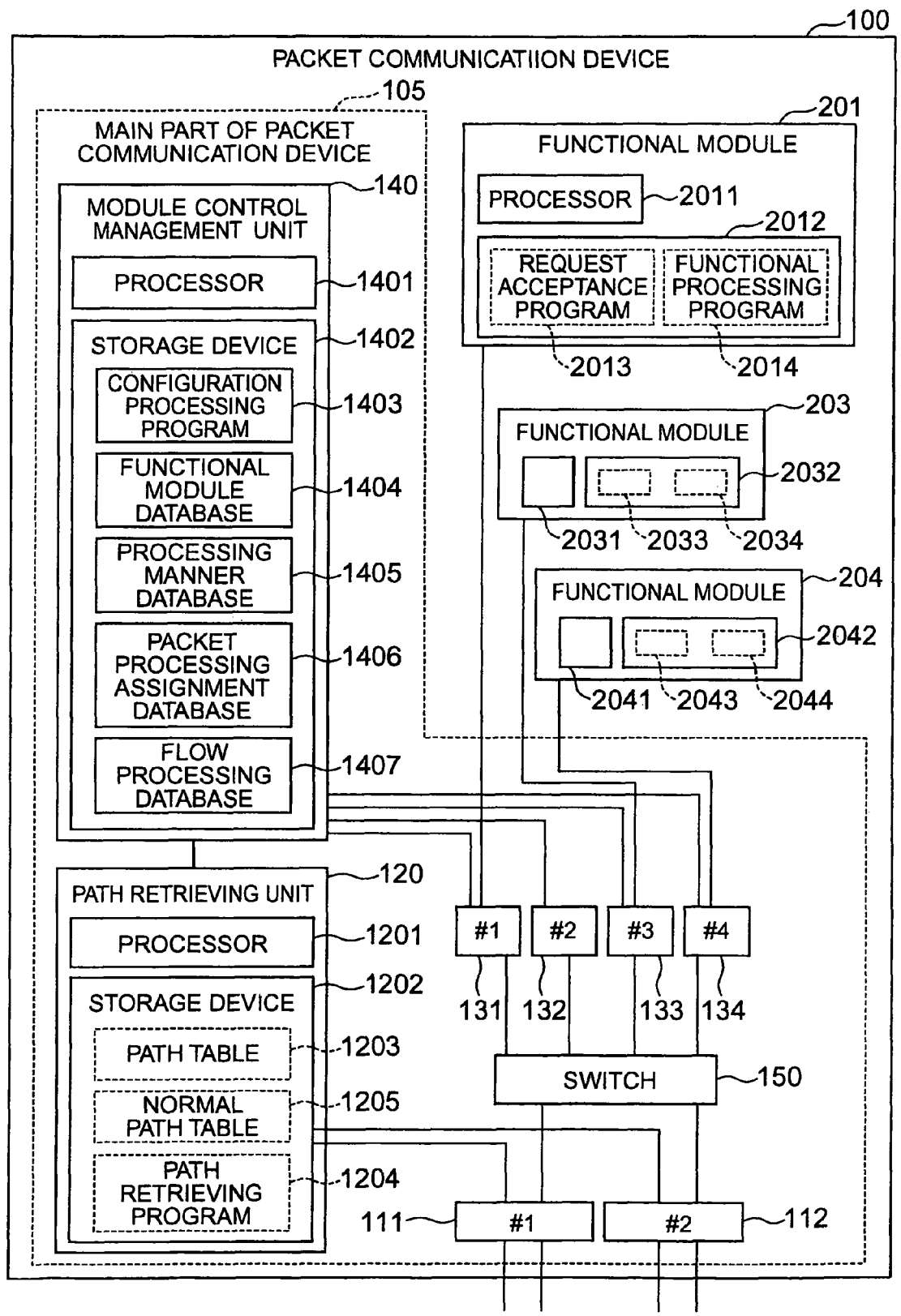
FIG. 2 is a diagram showing the configuration of the packet communication device.

FIG. 2 shows the packet communication device in this embodiment. The packet communication device 100 comprises a main part of packet communication device 105 and functional modules 201, 203, and 204. The main part of packet communication device 105 comprises network interfaces 111 and 112, a path retrieving unit 120, functional module interfaces 131, 132, 133, and 134, a module control management unit 140, and a switch 150. Although the numbers of those units are 2, 1, 4, 1, and 1 in FIG. 2, respectively, the present invention is not limited to those numbers but the number of units may be increased or decreased as necessary to improve performance.

The network interfaces 111 and 112 connect the external nodes, connected to the packet communication device 100, to the switch 150 for transmission and reception of packets. More specifically, the network interfaces 111 and 112 obtain the transfer destination of a received packet via the path retrieving unit 120 and send the packet to the switch 150 with the hardware ID attached to the packet.

The path retrieving unit 120 comprises a processor 1201 and a storage device 1202. A path retrieving program 1204 in the storage device 1202 looks up a packet received from the network interface 111 or 112 in a path table 1203 or an ordinary path table 1205, determines the transfer destination of the packet, and sends the determined transfer destination to the network interfaces 111 or 112. The content of the path table 1203 will be described later.

The switch 150 interconnects the network interfaces 111 and 112 and the functional module interfaces 131, 132, 133, and 134 with each other and transfers a received packet to the destination specified by the hardware ID in the packet.

The functional module interfaces 131, 132, 133, and 134 connect the switch 150 to the functional modules 201, 203, and 204 for packet transfer.

The module control management unit 140 comprises a processor 1401 and a storage device 1402. The module control management unit 140 is connected to the path retrieving unit 120 and the functional module interfaces 131, 132, 133, and 134. A configuration processing program 1403 in the storage device 1402 controls and manages the path retrieving unit 120 and the functional modules 201, 203, and 204 based on a functional module database 1404, a processing manner database 1405, a packet processing assignment database 1406, and a flow processing database 1407.

Although the module control management unit 140 is connected to the functional module interfaces 131, 132, 133, and 134 via independent lines in FIG. 2, the present invention is not limited to this configuration but a shared line such as a bus may also be used for connection.

The functional modules 201, 203, and 204, connected to the main part of packet communication device 105 via the functional module interfaces 131, 133, and 134, comprise processors 2011, 2031, and 2041 and storage devices 2012, 2032, and 2042, respectively. Functional processing programs 2013, 2033, and 2043 in the storage devices 2012, 2032, and 2042 are programs that perform highly functional processing, such as encryption, filtering, and routing setting for a received packet, in the processors 2011, 2031, and 2041, respectively. Request acceptance programs 2014, 2034, and 2044 in the storage devices 2012, 2032, and 2042 are programs that perform processing for an offering message and a requesting message, which will be described later, in the processors 2011, 2031, and 2041, respectively.

2. General Flow of Setting

To provide the service of the packet communication device 100 in this embodiment, the manager performs the following operation.

Connect a functional module to the main part of packet communication device 105

Create a configuration file specifying the operation of the packet communication device and set the configuration file in the packet communication device 100

Disconnect the functional module from the main part of packet communication device 105

The following describes how the packet communication device in this embodiment sets the operation setting in the functional modules 201, 203, and 204 based on the configuration file when the manager performs the operation described above.

<<Connection>>

Figure 3:
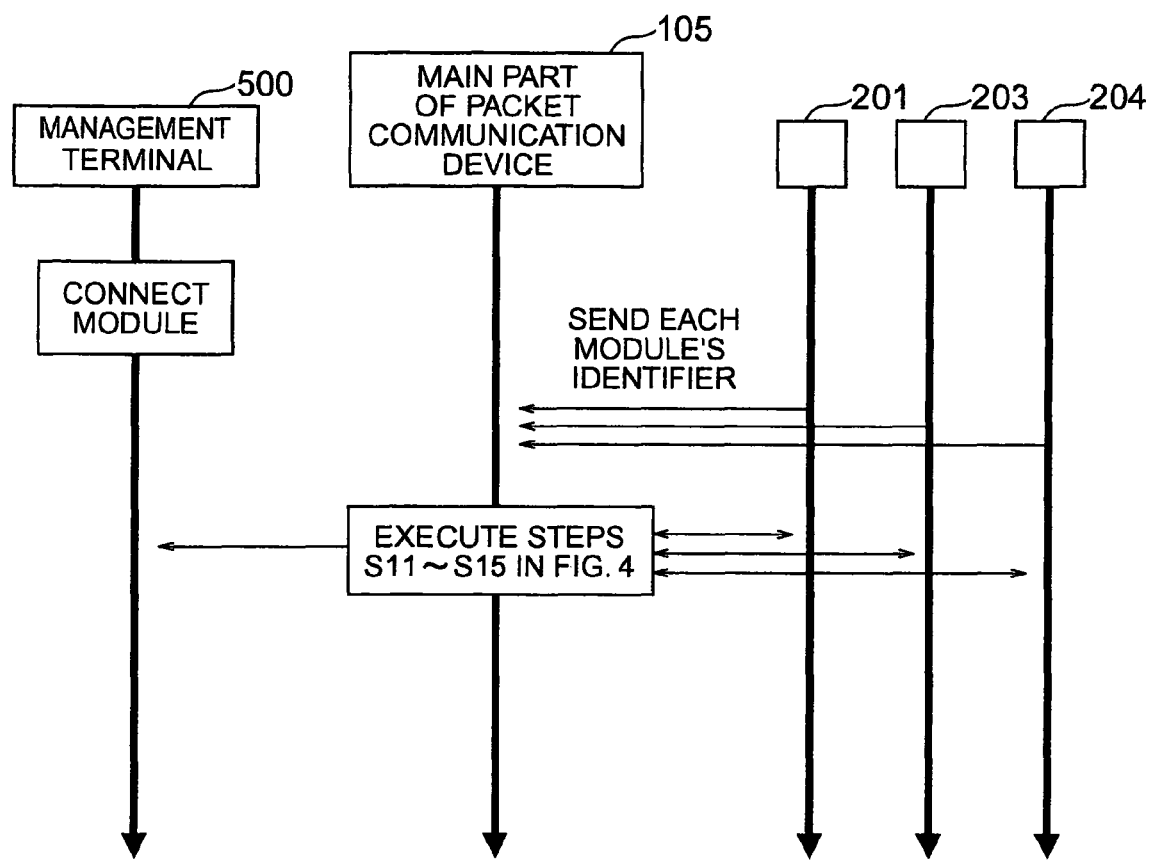
FIG. 3 is a sequence diagram showing the procedure for installing a module in the packet communication device.

FIG. 3 shows the procedure for connecting the functional modules 201, 203, and 204 to the main part of packet communication device 105.

First, the manager physically connects the functional modules 201, 203, and 204 to the main part of packet communication device 105 via the functional module interfaces 131, 133, and 134. When connected to the main part of packet communication device 105, the functional modules 201, 203, and 204 physically or electrically sense the connection and, upon sensing the connection, send their module identifiers to the module control management unit 140 of the main part of packet communication device 105. A protocol such as IP or the Ethernet (registered trademark of Fuji Xerox Co., Ltd) is used for the means for sending messages and data within the packet communication device. Those protocols are used also for the sending/receiving means that will be described later.

Figure 4:
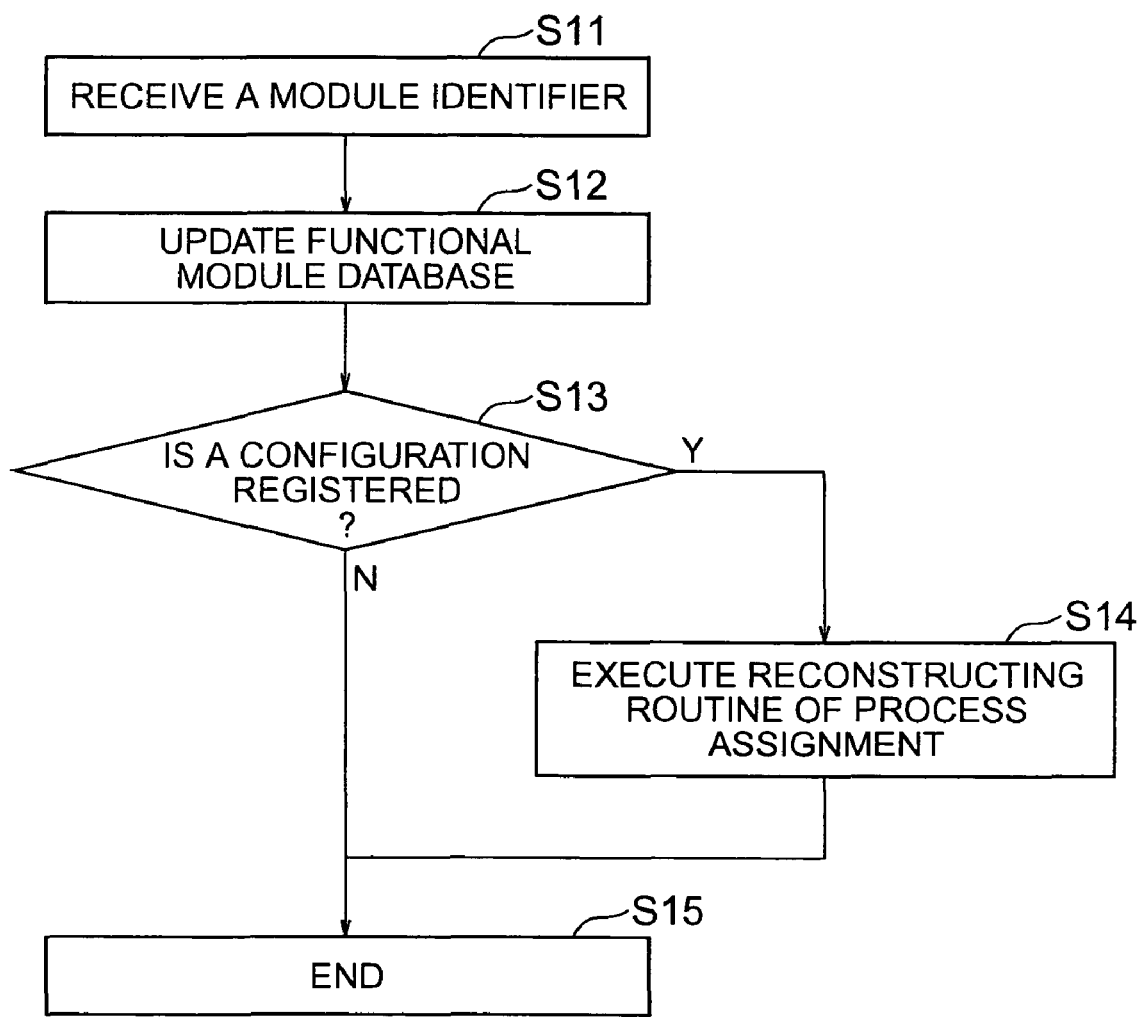
FIG. 4 is a flowchart showing the operation of a configuration processing program when the packet communication device receives a module identifier.

FIG. 4 is a flowchart showing the operation of the configuration processing program when the packet communication device receives a module identifier.

With reference to flowchart in FIG. 4, the following describes the operation of the main part of packet communication device 105 when it receives a module identifier. The processor 1401 of the module control management unit 140 in the main part of packet communication device 105 executes this processing according to the configuration processing program 1403 that is a program describing the operation explained below.

Upon receiving to a module identifier from each of the functional modules 201, 203, and 204 (S11), the processor 1401 records the received functional module interface number and the received module identifier in the functional module database 1404 (S12).

Figure 5:
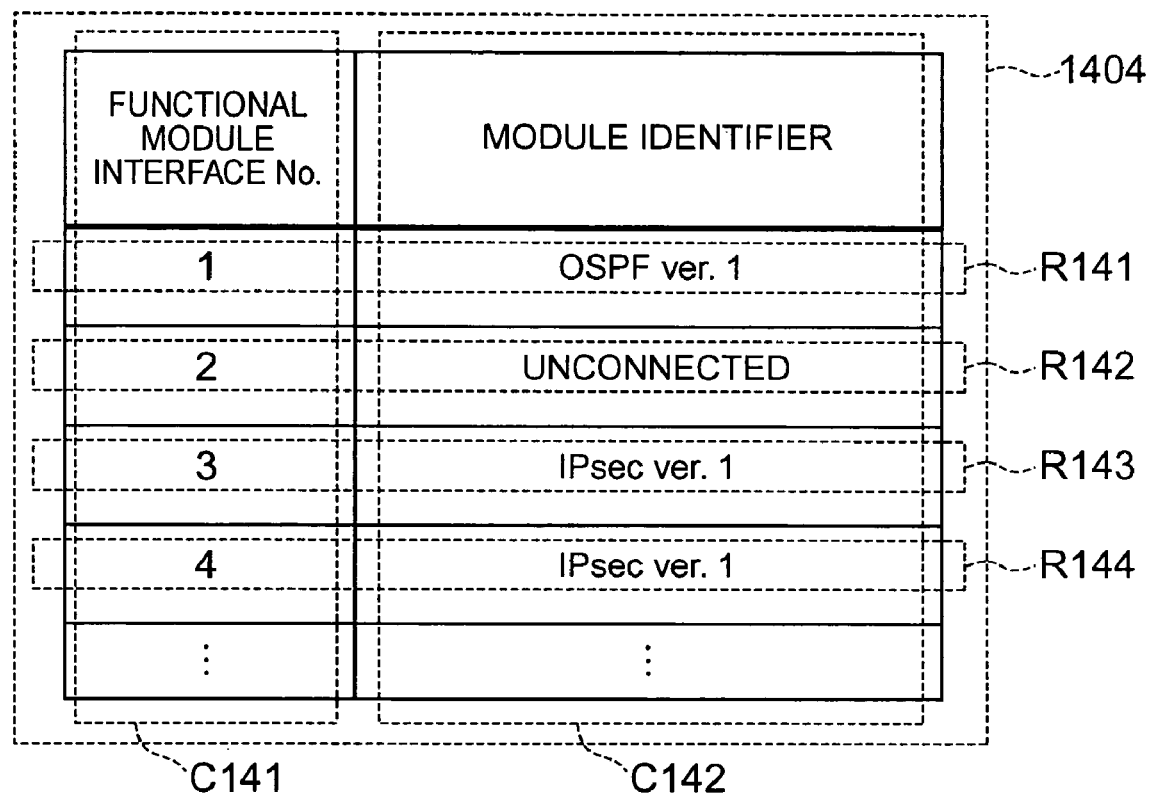
FIG. 5 is a diagram showing a functional module database in the packet communication device.

FIG. 5 shows the detail of the functional module database 1404. The functional module database 1404 includes a functional module interface number field C141 and a module identifier field C142. The processor 1401 rewrites the module identifier field C142 of the record, corresponding to the received functional module interface number, to the received module identifier. For example, when the functional module 201 with the module identifier "OSPF ver.1" is connected to the functional module interface 131 in FIG. 2, the information is saved in a record R141 whose functional module interface number is 1. Because no functional module is connected to the functional module interface 132, the information indicating the status ("unconnected") is saved in a record R142. When the functional modules 203 and 204 having the module identifier "IPSec ver.1" are connected to the functional module interfaces 133 and 134, the information indicating the status is saved in records R143 and R144.

After that, the processor 1401 checks if configuration information is registered in the processing manner database 1405 (S13). If the configuration information is registered, the processor 1401 performs the reconstruction of the process assignment database that will be described later (S14). If the configuration information is not registered, the processor 1401 passes control to step S15.

After the processing, the operation of the processor 1401 performed when the main part of packet communication device 105 receives a module identifier is completed (S15).

<<Update of Configuration File>>

Figure 6:
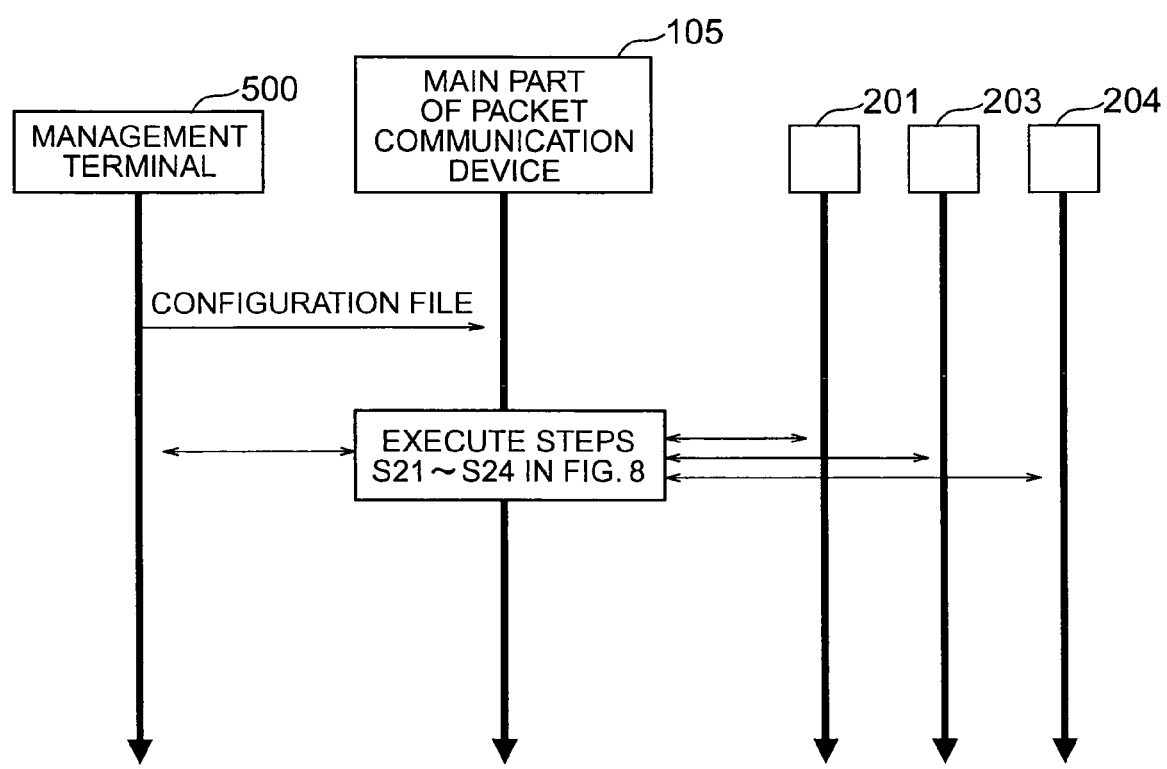
FIG. 6 is a sequence diagram showing the procedure for supplying a configuration file to the packet communication device.

FIG. 6 shows the procedure executed when a configuration file 50 is sent from the management terminal 500 for updating the processing manner database 1405 of the main part of packet communication device 105.

First, the manager sends the configuration file 50 to the main part of packet communication device 105 via the management terminal 500.

FIG. 7 shows the configuration of the configuration file 50. In the figure, the configuration is described in the XML (Extensive Markup Language) format. The configuration file 50 includes one or more flowblock elements 51 each describing processing for a flow. The flowblock element 51 includes one or more flow elements 52 each indicating a flow condition for identifying a packet as a flow and one or more action elements 53 and 56 each describing the content of processing for the packet of the flow. More specifically, the process content described by the action elements 53 and 56 is applied, in this order, to a packet that satisfies the condition "the destination address is 192.168.100.0/255.255.255.0 and the protocol number is 89" that is the flow condition indicated by the flow element 52. The action elements 53 and 56 include process type IDs 53*a* and 56*a* that indicate the type of process content and requested process items 54, 55, 57, and 58, respectively. The requested process items 54, 55, 57, and 58 include requested process item names 54*a*, 55*a*, 57*a*, and 58*a* and requested process item values 54*b*, 55*b*, 57*b*, and 58*b*. What can be coded for the requested process item names and the requested process item values (process item schema) is determined separately as an XML schema according to the process type ID. This process item schema can be used only by the manager and the module. The main part of packet communication device 105 does not use the process item schema but sends and receives the requested process item names and requested process item values to and from the manager and the module simply as character string data.

Figure 8:
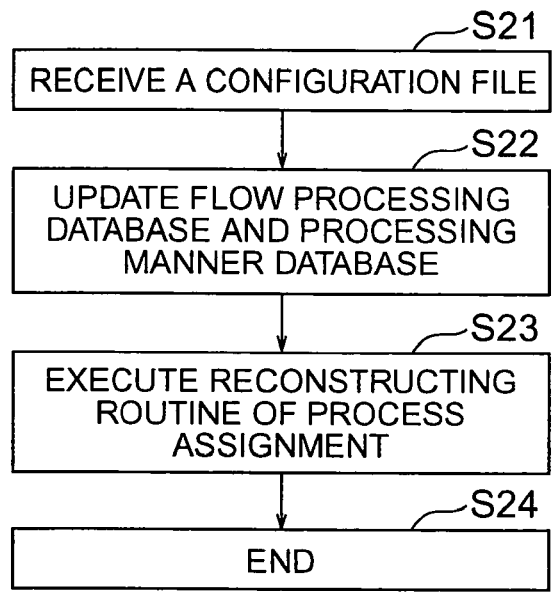
FIG. 8 is a flowchart showing the operation of the configuration processing program when the packet communication device receives the configuration file.

FIG. 8 is a flowchart showing the operation of the configuration processing program when the packet communication device receives a configuration file.

Next, with reference to the flowchart in FIG. 8, the following describes the operation of the main part of packet communication device 105 when the configuration file 50 is received. The processor 1401 of the module control management unit 140 in the main part of packet communication device 105 executes this processing according to the configuration processing program 1403 that is a program describing the operation described below.

In response to the configuration file 50 from the management terminal 500 (S21), the processor 1401 updates the flow processing database 1407 and the processing manner database 1405 according to the received configuration file (S22).

Figure 21:
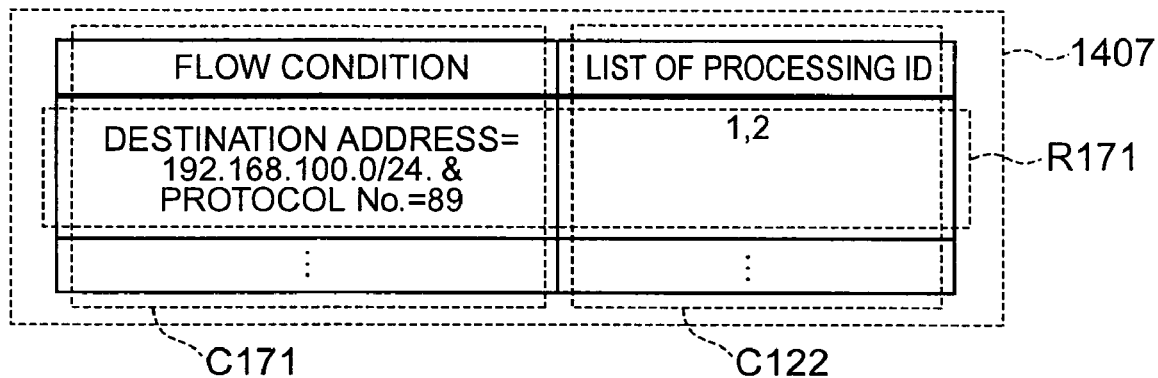
FIG. 21 is a diagram showing the detail of a flow processing database.

FIG. 21 shows the detail of the flow processing database 1407. For each flowblock element in the configuration file 50, the flow processing database 1407 includes a flow condition field C171 in which a flow element is stored and a list-of-processing-ID field C172 in which unique values assigned to action elements are stored.

Figure 9:
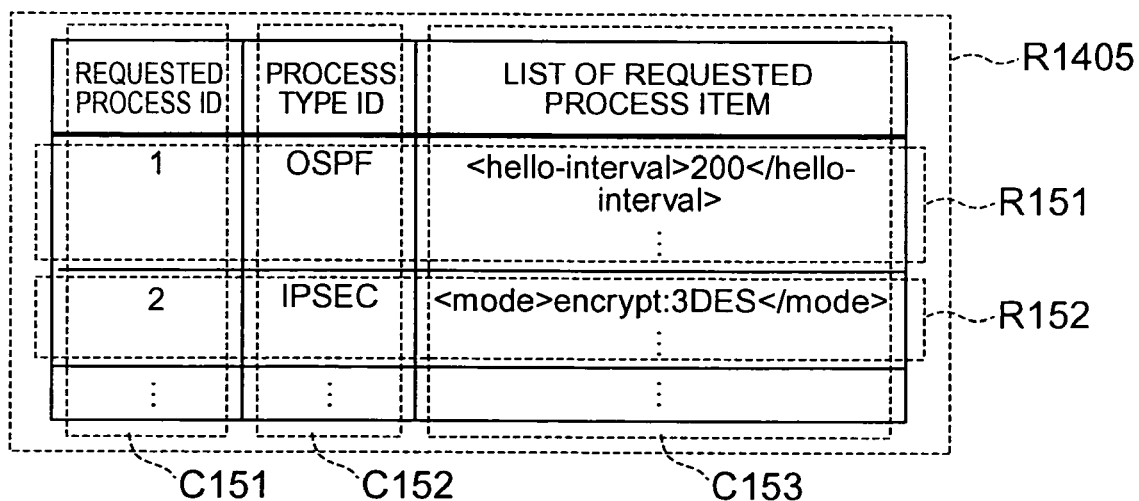
FIG. 9 is a diagram showing a processing manner database in the packet communication device.

FIG. 9 shows the detail of the processing manner database 1405. For each action element in the configuration file 50, the processing manner database 1405 includes a requested process ID field C151 in which a unique value assigned to the action element in the configuration file 50 is stored, a process type ID field C152 in which a process type ID such as "OSPF" and "IPSEC" specified for the action element is stored, and a list-of-requested-process-item field C153 in which the requested process items 54, 55, 57, and 58 in the action elements are stored.

For example, when the configuration file 50 in FIG. 7 is received, the flow processing database 1407 and the processing manner database 1405 are updated as described below. First, the processor 1401 assigns unique values 1 and 2 to the action elements 53 and 56 in the configuration file 50 respectively as their requested process IDs. After that, the processor 1401 saves the requested process ID "1" of the action element 53, the process type ID 53*a*, and the process items 54 and 55 into R151 of the processing manner database 1405 and, then, the requested process ID "2" of the action element 56, the process type ID 56*a*, and the process items 57 and 58 into R152 of the processing manner database 1405. Next, the processor 1401 saves the flow condition specified by the flow element 52 and the requested process IDs (1, 2) assigned to the action elements 53 and 56 into R171 of the flow processing database 1407.

Next, the processor 1401 reconstructs the packet processing assignment database (S23). The reconstruction of the packet processing assignment database will be described later.

After the processing described above is finished, the operation of the processor 1401 executed when the main part of packet communication device 105 receives the configuration file 50 is completed (S24).

<<Reconstruction of Packet Processing Assignment Database>>

The following describes the procedure for reconstructing the packet processing assignment database with reference to FIG. 10 to FIG. 17. When reconstructing the packet processing assignment database, the processor 1401 in the main part of packet communication device 105 executes the configuration processing program 1403 to configure operation setting of the functional modules 201, 203, and 204 based on the processing manner database 1405. The following describes a first embodiment and a second embodiment of the operation of the main part of packet communication device 105.

Figure 10:
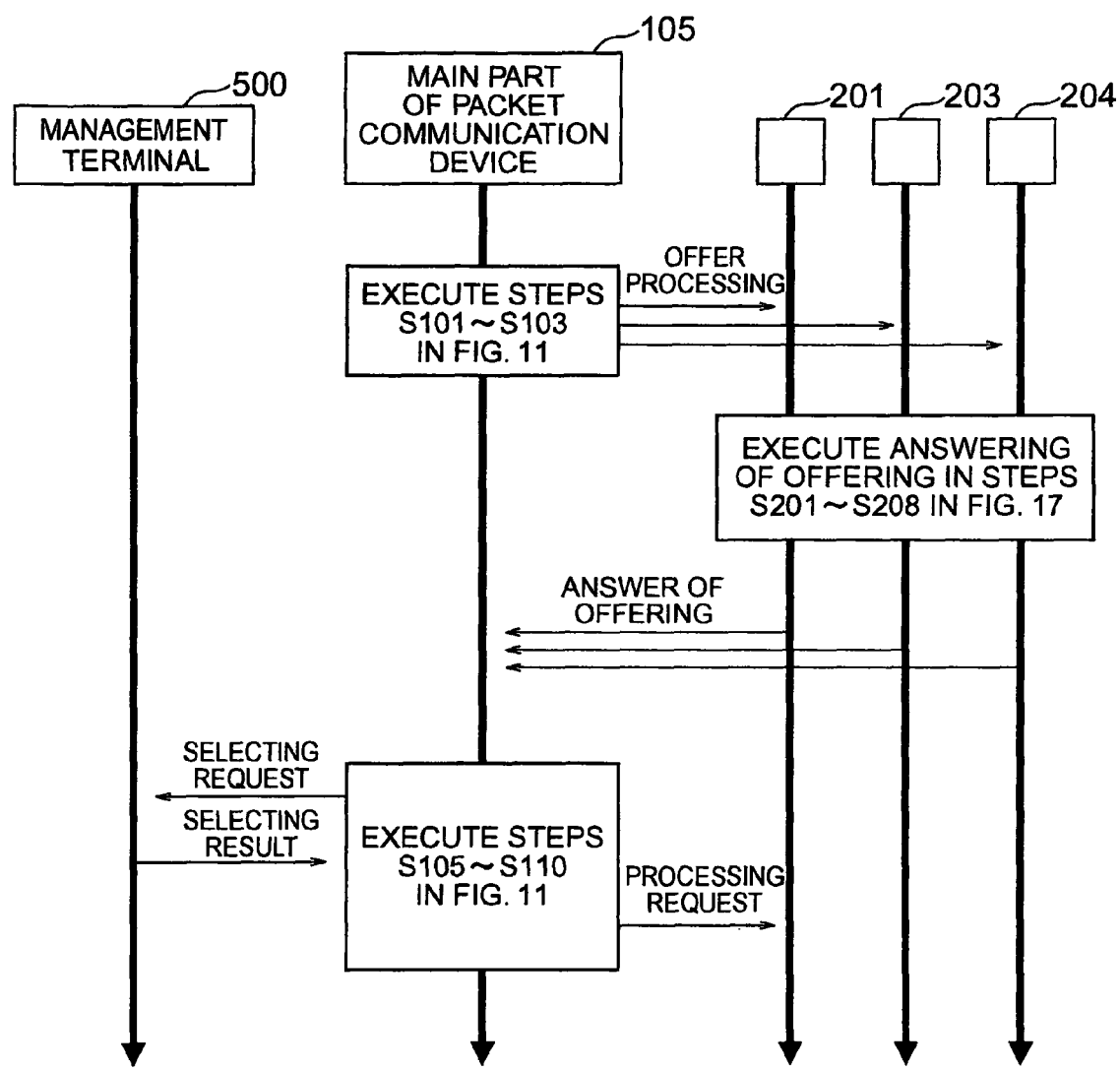
FIG. 10 is a sequence diagram showing the procedure for reconstructing a packet processing assignment database in the packet communication device.

First, with reference to FIG. 10, the following overviews the processing procedure executed by the management terminal 500, the main part of packet communication device 105, and the functional modules 201, 203, and 204. After that, the operation of the main part of packet communication device 105, included in the figure, in the first embodiment is described with reference to the flowchart in FIG. 11, the operation in the second embodiment is described with reference to the flowchart in FIG. 20, and the operation of the functional modules 201, 203, and 204 is described with reference to the flowchart in FIG. 17.

First Embodiment

FIG. 10 shows the processing procedure executed for each record (corresponds to R151, R152 in FIG. 9), included in the processing manner database 1405 in the main part of packet communication device, when the packet processing assignment database is reconstructed.

First, the main part of packet communication device 105 sends an offering message 800 to the functional modules 201, 203, and 204. The functional modules 201, 203, and 204 perform determination processing, which will be described later, and send the answer of offering to the main part of packet communication device 105. Depending upon the received answer of offering, the main part of packet communication device 105 sends the answer of offering to the management terminal 500 as a selecting request to allow the manager to make a selection and receives the selecting result. Then, the main part of packet communication device 105 selects a functional module, to which processing is to be assigned, based on the answer of offering and the selecting result, and records the selecting result in the packet processing assignment database 1406. In addition, the main part of packet communication device 105 sends a requesting message to the selected functional module.

The overview of the processing procedure shown in FIG. 10 and executed when the packet processing assignment database is reconstructed is as described above.

Figure 11:
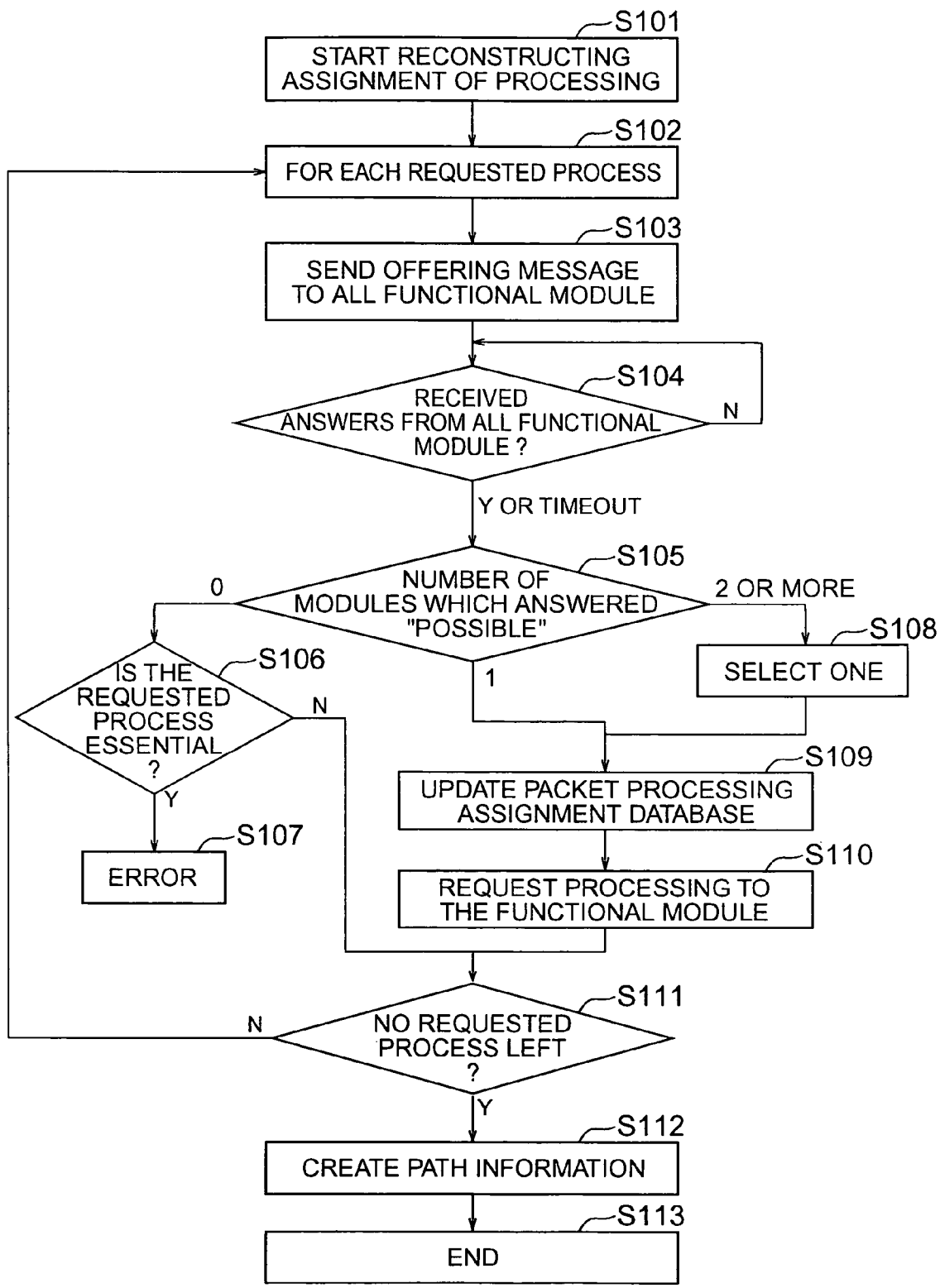
FIG. 11 is a flowchart showing the operation of the configuration processing program when the packet processing assignment database in the packet communication device is reconstructed.

FIG. 11 is a flowchart of the first embodiment showing the operation of the configuration processing program that is executed when the packet processing assignment database of the packet communication device is reconstructed.

Next, the following describes the detail of the operation of the main part of packet communication device 105 in the first embodiment, which is executed when the packet processing assignment database is reconstructed, with reference to the flowchart in FIG. 11. This processing is executed by the processor 1401 of the module control management unit 140 in the main part of packet communication device 105 according to the configuration processing program 1403 that is a program describing the operation described below.

When the reconstruction of the packet processing assignment database is started (S101), the processor 1401 starts a loop for each record (requested process) in the processing manner database 1405 (S102).

First, the processor 1401 sends the offering message 800 to the functional modules 201, 203, and 204 in the packet communication device 100 (S103).

Figure 12:
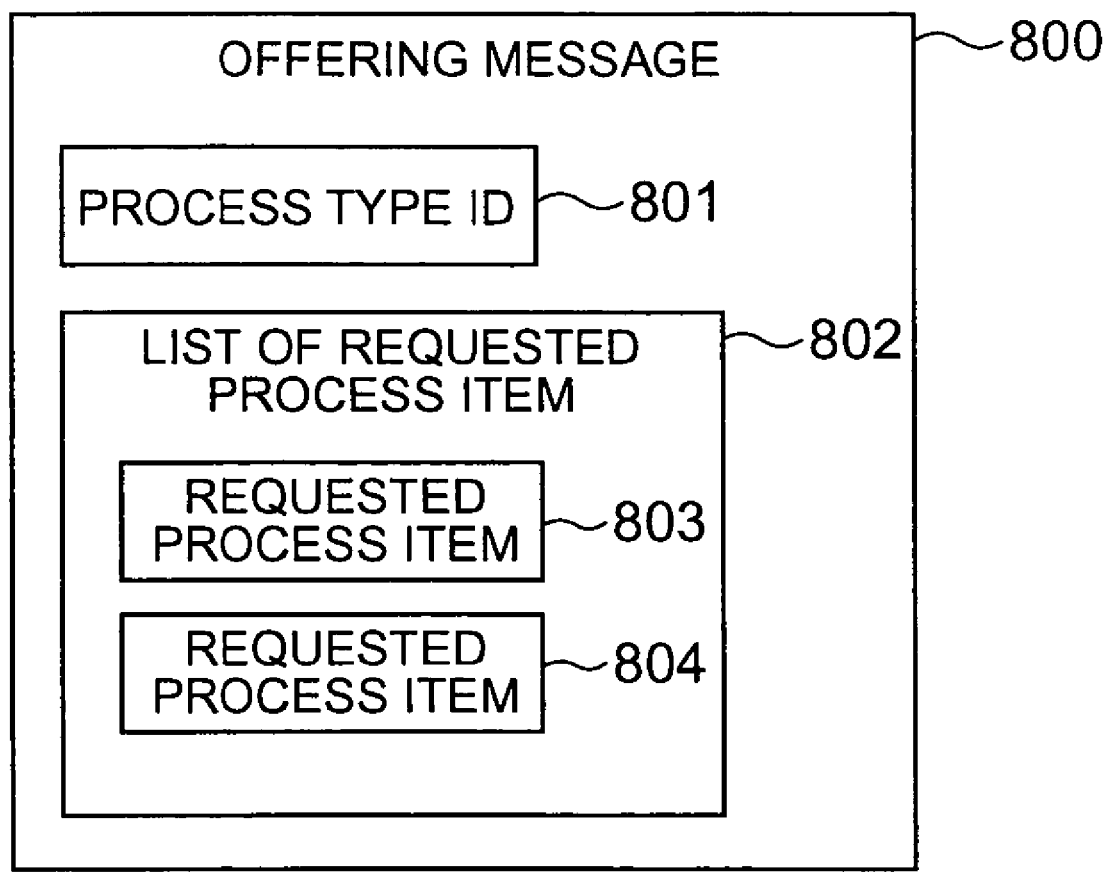
FIG. 12 is a diagram showing an offering message sent from the packet communication device.

FIG. 12 is a diagram showing an offering message of the packet communication device.

The offering message 800 includes a process type ID 801 (C152 in FIG. 9) and a list of requested process items (C153 in FIG. 9) of the requested process.

The offering message 800 may be sent either to all functional modules or only to a functional module selected by comparing the process type ID 801 of the offering message 800 with the correspondence table, which contain the correspondence between the process type ID fields of the requested process and the module identifiers of the functional modules 201, 203, and 204, stored in advance in the main part of packet communication device 105. The offering message 800 may also be sent to multiple functional modules at the same time by connecting the module control management unit 140 to the functional module interfaces 131, 133, and 134 via a bus via which the offering message is sent in the broadcasting or multicasting mode.

Next, the processor waits for the answer of offering to be received from the functional modules 201, 203, and 204 to which the offering message 800 was sent (S104). The answer of offering message includes an answer of offering indicating "possible" or "impossible". If a predetermined time elapses without receiving the answer of offering message in this reception wait state, the processor assumes that the functional module fails and passes control to the next processing assuming that the answer indicating "impossible" is received from the functional module.

Next, the processor checks the number of functional modules that returned "possible" (S105). If the number of functional modules that returned "possible" is 0, the processor 1401 checks if the requested process is specified by the manager as essential (S106). If so, the processor 1401 notifies the manager that a configuration file error is detected and ends the reconstruction process of the packet processing assignment database (S107). On the other hand, if the requested process is not essential, the processor 1401 ignores the requested process and passes control to step S111 to check whether to leave the loop.

If the number of functional modules that returned "possible" is 1 in step S105, the processor 1401 selects the functional module, which returned "possible", as the functional module to which the process is to be assigned and passes control to step S109.

If the number of functional modules that returned "possible" is 2 or more in step S105, the processor 1401 sends the information (name, interface number, module identifier, list of process IDs, etc.) on the functional modules, which returned "possible", to the management terminal 500 as the selecting request to allow the manager to select a functional module, to which the process is to be assigned, from those functional modules.

Figure 13:
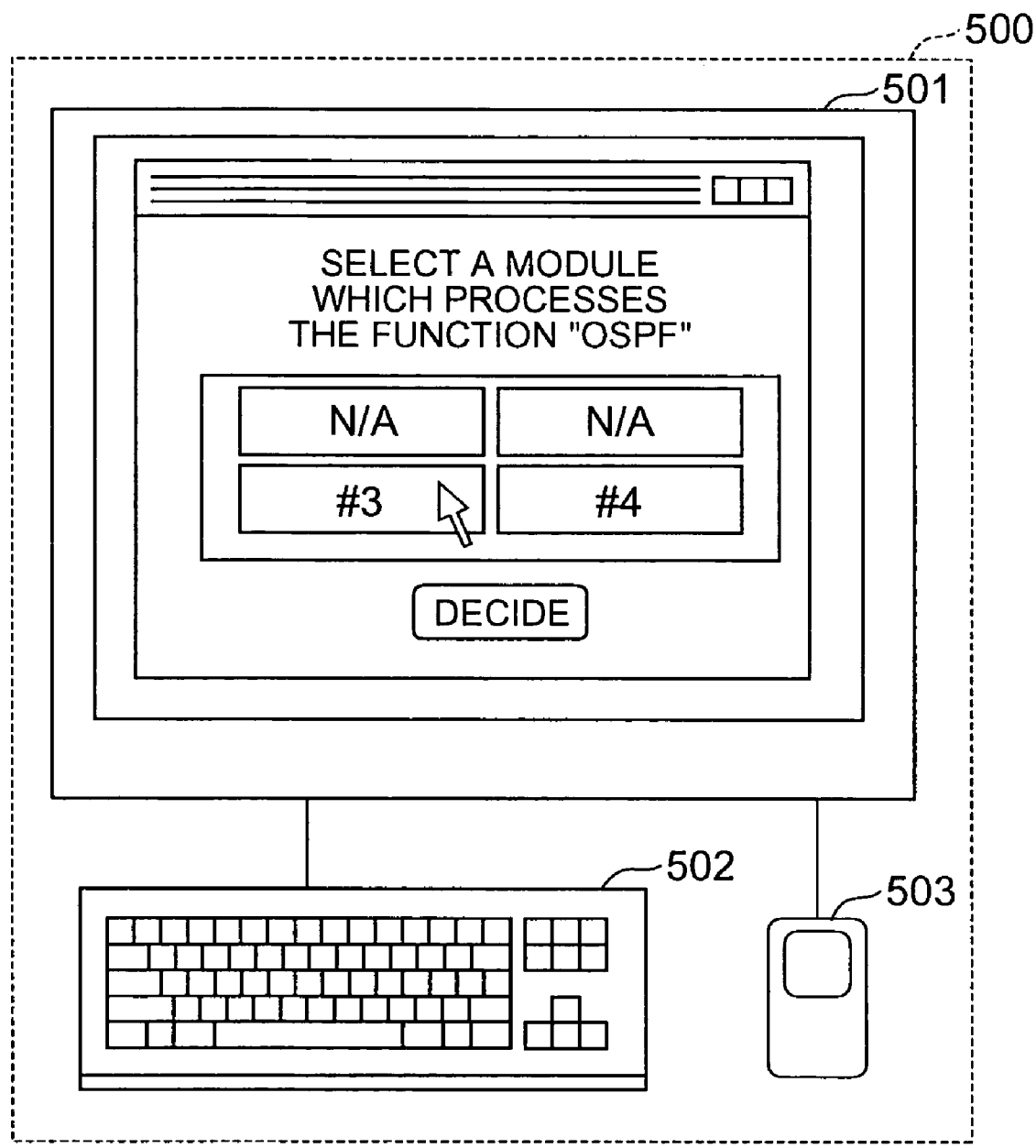
FIG. 13 is a diagram showing the management terminal interface for answering an inquiry from the packet communication device.

FIG. 13 is a diagram showing the interface of the management terminal for answering an inquiry from the packet communication device.

The following describes the management terminal 500. The management terminal 500 comprises a screen 501 and input devices 502 and 503. When a selecting request is received from the main part of packet communication device 105, the name, the interface number, the module identifier, and the physical position within the device are displayed on the screen 501 of the management terminal 500 for each of multiple functional modules that returned "possible" so that the manager can identify each of them. The manager views the screen 501 and selects one of them using the input devices 502 and 503. The management terminal 500 sends the information, which identifies the functional module, to the main part of packet communication device 105 as the selecting result.

When the main part of packet communication device 105 receives the selecting result from the management terminal 500, the processor 1401 select the functional module, to which the process is to be assigned, from the selection information included in the received selecting result (S108).

Instead of sending the selecting request to the management terminal 500 to allow the manager to select one of functional modules as described above, it is also possible that the functional modules 201, 203, and 204 determine priority for a requested process when an offering message is received and send the answer of offering message, in which the priority information is included, to allow the processor 1401 to select a functional module, to which the process is to be assigned, based on the priority information.

It is also possible to select multiple functional modules at the selection time and assign the same process to those functional modules to improve the availability and processing performance of the requested process. At this time, a method for selecting multiple functional modules may also be specified in the processing manner database 1405. For example, with priority information included in the answer of offering message, only those functional modules, whose priority information matches the condition specified in the processing manner database 1405, are selected, or the information (name, interface number, etc.) on the functional modules, which returned "possible", is sent to the management terminal 500 as a selecting request to allow the manager to make a selection.

In addition, it is also possible that the processor 1401 of the module control management unit 140 selects the functional modules 201, 203, and 204, which are to perform the processing, based on the answer of offering and, after the functional module which is to perform the processing is determined, stops sending the process content to the remaining functional modules.

After selecting the functional module to which the processing is to be assigned, the processor 1401 updates the packet processing assignment database 1406 (S109).

Figures 14, 15:
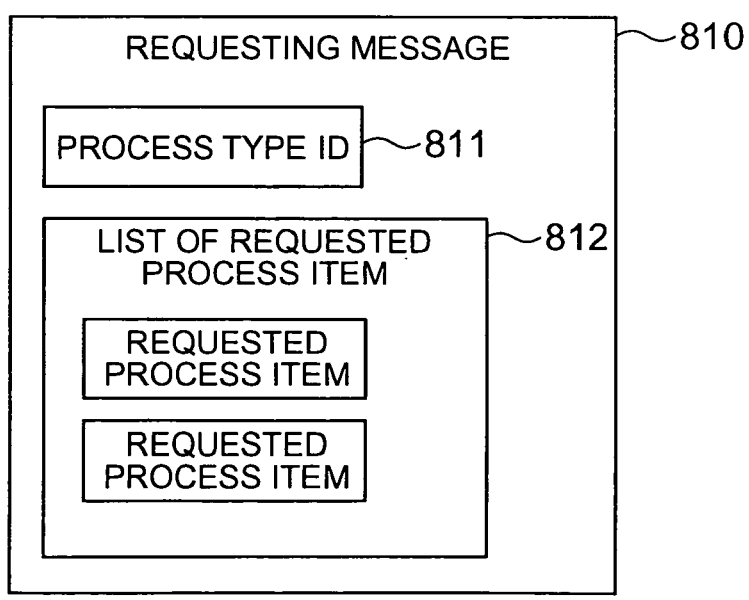
FIG. 14 is a diagram showing the packet processing assignment database in the packet communication device.
FIG. 15 is a diagram showing a requesting message sent from the packet communication device.

FIG. 14 is a diagram showing the packet processing assignment database of the packet communication device. The packet processing assignment database 1406 comprises a requested process ID field C161, an available functional module interface No. field C162, and an assigned functional module interface No. field C163. For a record of the packet processing assignment database 1406 whose requested process ID field C161 has the same value as that in the requested process ID field C151 of the record of the processing manner database 1405 that is being processed, the processor 1401 stores the numbers of all the interfaces, to which the functional modules that returned "possible" are connected, in the available functional module interface No. field C162. The processor 1401 also stores the interface number of the functional module selected as a functional module, to which the processing is to be assigned, in the assigned functional module interface No. field C163. For example, the fields of a record R161 store the following values; the requested process ID field C161 stores the value of the requested process ID field C151 of the record R151 in FIG. 9 (that is, 1) that represents the corresponding requested process, and the available functional module interface NO. field C162 stores the number of the functional module interface (1 in this example) to which the functional module, which returned "possible" to the offering message of the corresponding requested process, is connected. The fields of a record R162 store the following values; the requested process ID field C161 stores the value of the requested process ID field C151 of the record R152 in FIG. 9 (that is, 2) that represents the corresponding requested process, the available functional module interface NO. field C162 stores the numbers of the functional module interfaces (3 and 4 in this example) to which the functional modules, which returned "possible" to the offering message of the corresponding requested process item, are connected, and the assigned functional module interface No. field C163 stores the number of the functional module interface (3 in this example), to which the functional module selected by the manager via the management terminal 500, is connected.

Next, the processor 1401 sends a requesting message 810 to the functional module selected as a functional module to which the processing is to be assigned (S110).

FIG. 15 is a diagram showing the requesting message issued by the packet communication device. The requesting message 810 includes a process type ID 811 and a list of requested process items 812. Those values are the same as those of the process type ID 801 and a list of requested process items 802 of the offering message 800 that was sent immediately before.

After the processing described above, processing for one requested process is completed. This processing is performed for all requested processes repeatedly and, after that, control leaves the requested process loop (S111).

After the above processing is completed for all requested processes, the processor 1401 sets up the path table 1203 in the path retrieving unit 120 so that the packets received via the network interfaces 111 and 112 are transferred to the functional modules 201, 203, and 204 under the condition, and in the sequence, specified in the configuration file 50 (S112) (for the detail of the path table 1203, see FIG. 16 and its description that will be given later).

More specifically, the processor 1401 of the module control management unit 140 issues a command to the path retrieving unit 120 so that the packets, which satisfy the condition described above, are sent to the functional modules 201, 203, and 204 selected by the assignment processing described above, and the processor 1201 of the path retrieving unit 120 sets up the path table 1203 according to the command.

It is also possible to send a command to the path retrieving unit 120 so that the packets, specified by the packet condition in the configuration information corresponding to an offering message, are sent to the functional modules 201, 203, and 204, selected by the module control management unit 140, with the load and the function distributed according to the procedure specified in the configuration information.

Second Embodiment

Figure 20:
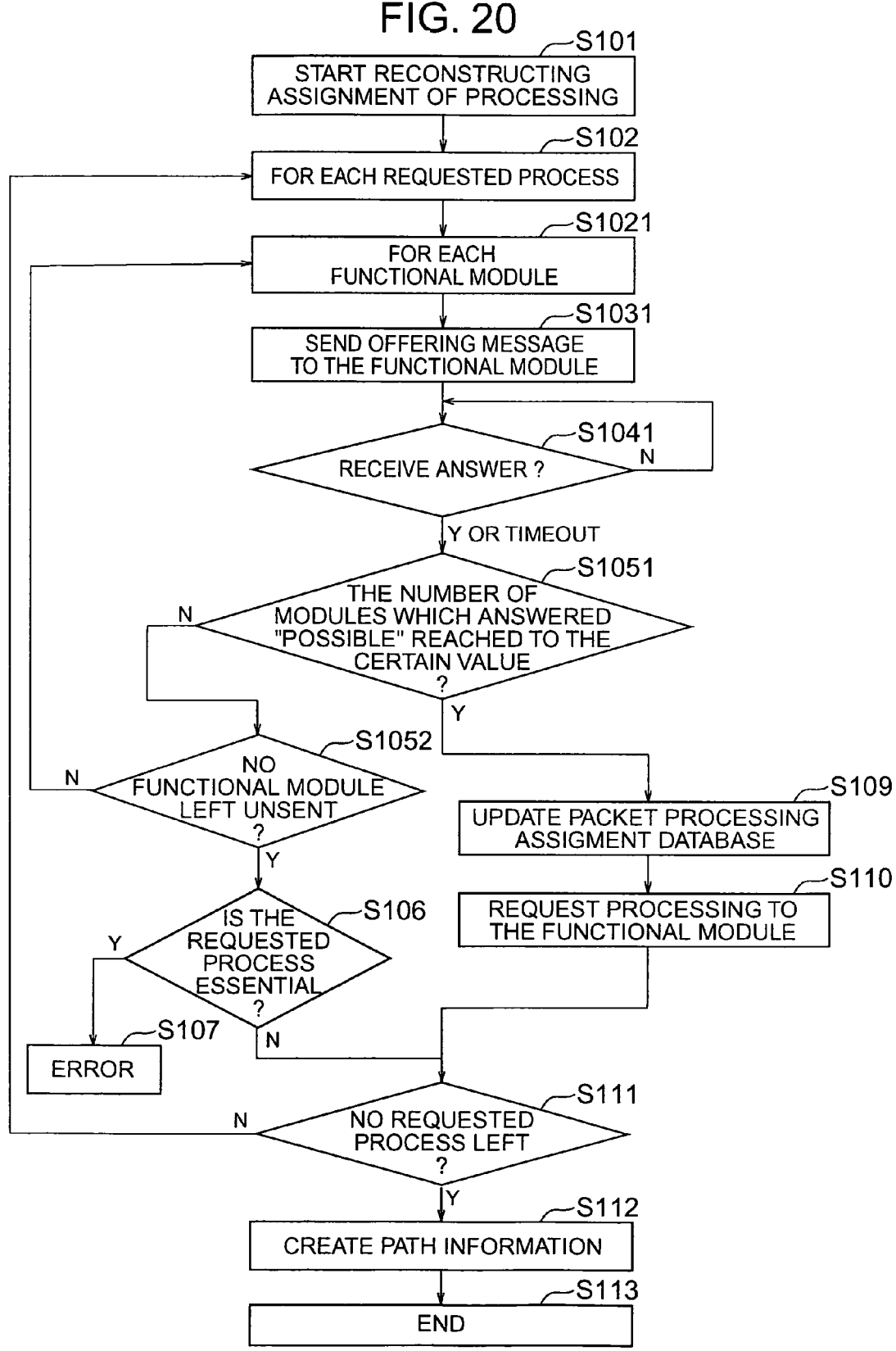
FIG. 20 is a flowchart of a second embodiment showing the operation of the configuration processing program when the packet processing assignment database in the packet communication device is reconstructed.

FIG. 20 is a flowchart of a second embodiment indicating the operation of the configuration processing program when the packet processing assignment database of the packet communication device is reconstructed.

Next, with reference to the flowchart in FIG. 20, the following describes the detailed operation of the second embodiment of the main part of packet communication device 105 when the packet processing assignment database is reconstructed. As in the first embodiment, the processor 1401 of the module control management unit 140 in the main part of packet communication device 105 executes this processing according to the configuration processing program 1403 in which the operation described below is coded as a program.

When the reconstruction of the packet processing assignment database is started (S101), the processor 1401 starts the loop for each record (requested process) in the processing manner database 1405 (S102) and then starts the loop for each functional module (S1021).

Next, the processor 1401 sends the offering message 800 (S1031), similar to that in the first embodiment, to the functional module and waits for the answer of offering message, similar to that in the first embodiment, to be received from the functional module (S1041). If a predetermined time elapses without receiving the answer of offering message in this reception wait state, the processor assumes that the functional module fails and passes control to the next processing assuming that the answer indicating "impossible" is received from the functional module.

Next, the processor checks if the number of functional modules that returned "possible" to the process has reached the certain number (S1051). If the certain number is not reached, the processor checks if the offering message is sent to all functional modules (S1052). If there is one or more functional modules to which the offering message is not yet sent, control is passed back to step S1021 to perform the same processing for the remaining functional modules. On the other hand, if the offering message is sent to all functional modules, the processor checks if the requested process is specified by the manager as essential (S106). If so, the processor notifies the manager that a configuration file error is detected and ends the reconstruction process of the packet processing assignment database (S107). On the other hand, if the requested process is not specified as essential, the processor ignores the requested process and passes control to step S111 to check whether to leave the loop.

If the certain number is reached in step S1051, the processor 1401 selects the functional module as a functional module to which the process is to be assigned and, as in the first embodiment, updates the packet processing assignment database 1406 shown in FIG. 14 (S109). In addition, the processor 1401 sends the requesting message 810, shown in FIG. 15, to the selected functional module (S110).

After the processing described above, the processing for one requested process is completed. After repeating this processing for all requested processes, control leaves the requested process loop (S111). After performing the above processing for all requested processes, the processor 1401 sets up the path table 1203 in the path retrieving unit 120 as in the first embodiment (S112). When the path table 1203 is set up, the setting process ends (S113).

<<Functional Module Processing>>

Figure 17:
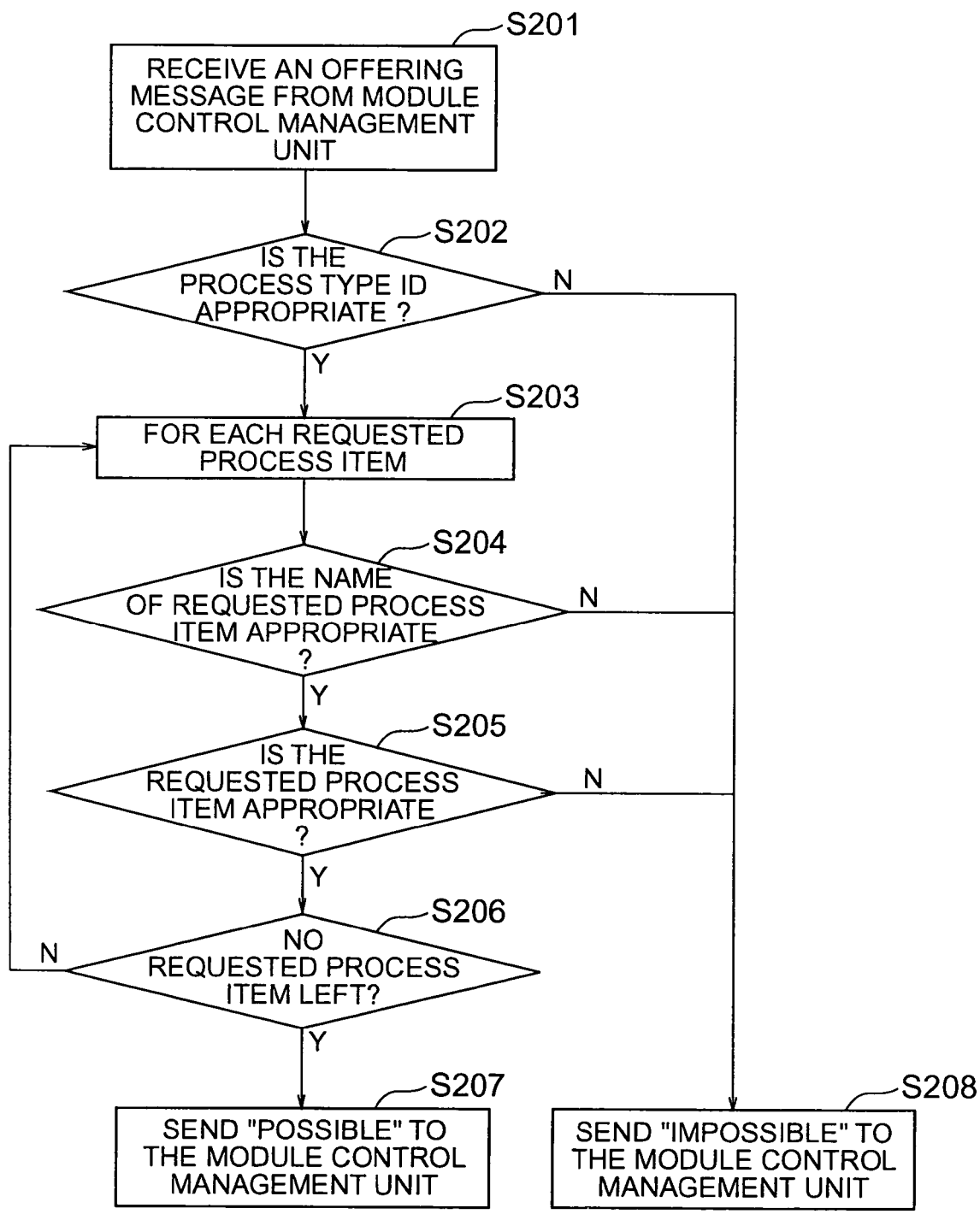
FIG. 17 is a flowchart showing the determination processing of a request acceptance program in a functional module in the packet communication device.

FIG. 17 is a flowchart showing the checking processing performed by the request acceptance program of a functional module in the packet communication device.

Next, with reference to the flowchart in FIG. 17, the following describes the operation of the functional modules 201, 203, and 204 when the offering message 800 is received from the main part of packet communication device 105. The processors 2011, 2031, and 2041 in the functional modules 201, 203, and 204 execute this processing according to the request acceptance programs 2014, 2034, and 2044 that are programs describing the operation described below.

When each of the functional modules 201, 203, and 204 receives the offering message 800 (S201), each of the processors 2011, 2031, and 2041 references the process type ID 801 included in the offering message 800 and checks if the process type ID 801 matches the process type ID that is registered or set in advance in the functional module (S202). If no match is found in the checking in step S202, control is passed to S208.

On the other hand, if a match is found, the processor of the functional module starts the loop of the items (803, 804) in the list of requested process items 802 in the offering message 800 (S203). First, the processor checks if the requested process item name of the requested process item matches the one registered or set in the functional module, 201, 203, or 204, in advance (S204). If no match is found in the checking in step S204, control is passed to S208. On the other hand, if a match is found, the processor checks if the functional module, 201, 203, or 204, can perform the packet processing under the condition of the requested process item value of the requested process item (S205). If it is determined as the result of checking in step S205 that the functional module cannot perform the packet processing, control is passed to S208.

The following describes the checking processing in steps S202 to S205 more in detail. For example, when the requested process is specified by the record R152 in FIG. 9, the offering message 800 shown in FIG. 12 includes the following content. That is, the process type ID 801 is "IPSEC", the requested process item 803 has the requested process item name of "mode" and the requested process item value of "encrypt:3DES". Also, the requested process item 804 has the requested process item name of "throughput" and the requested process item value of "10 Mbps". For example, assume that the following is set up in advance in the module 203; that is, for a requested process whose process type ID is "IPSEC", the requested process item names "mode" and "throughput" are accepted, that one of the requested process item values "encrypt:DES", "encrypt:3DES", "decrypt: DES", "decrypt:3DES", and "decrypt:AES" is accepted for "mode", and that the requested process item value "1 Mbps" to "10 Mbps" is accepted for "throughput". In this case, all the checking by the processor 2031 in steps S202, S204, and S205 result in "true". If the setting is specified in advance that the requested process item value is one of "encrypt:DES" and "decrypt:DES" when the requested process item name is "mode", the checking in step S205 results in "false". If "throughput" is not set as an acceptable requested process item name in the functional module 203, the checking in step S204 results in "false", and, if "IPSEC" is not set as an acceptable process type ID in the functional module 203, the checking in step S202 results in "false".

If it is determined in step S205 that packet processing is possible, the processor checks if control leaves the required process item loop (S206). If all requested processes are not yet checked, control is passed back to S203.

If it is determined that packet processing can be performed for all requested process items, the functional module sends the information indicating "possible" to the module control management unit 140 as the answer of offering message (S207). On the other hand, if control is passed to step S208, the functional module sends the information indicating "impossible" to the module control management unit 140 as the answer of offering.

Next, the following describes the operation performed after the functional modules 201, 203, and 204 receive the requesting message 810 from the main part of packet communication device.

Upon receiving the requesting message 810, the functional module, 201, 203, or 204, assigns the resources, such as the processor, 2011, 2031, or 2041, and the storage device, 2012, 2032, or 2042, in the functional module, 201, 203, or 204, to the packets, which will be received, according to the contents of the process type ID 811 and the list of requested process items 812 in the requesting message 810 and sets the variables used by the functional processing program, 2013, 2033, or 2043.

Another method for processing setup via the requesting message 810 is also available, in which case the requesting message 810 includes, not the process type ID 811 and the list of requested process items 812, but the identification number identifying the offering message 800 sent by the processor 1401 immediately before. In this method, the functional modules 201, 203, and 204 store the content of the offering message 800, received from the processor 1401, and, upon receiving the requesting message 810, references the process type ID 801 and the list of requested process items 802 by means of the identification number and, according to the content, assigns the resources, such as the processors 2011, 2031, and 2041 and the storage devices 2012, 2032, and 2042, and sets the variables used by the functional processing programs 2013, 2033, and 2043.

<<Packet Transfer>>

Next, the following describes the packet processing operation of the packet communication device 100 using an example in which the packet communication device 100 receives a packet, whose destination IP address is 192.168.100.1 and whose protocol number is 89, via the network interface (1) 111.

The header of the received packet is sent to the path retrieving unit 120. The processor 1201 of the path retrieving unit finds the destination functional module by referencing the path table 1203 according to the path retrieving program 1204.

Figure 16:
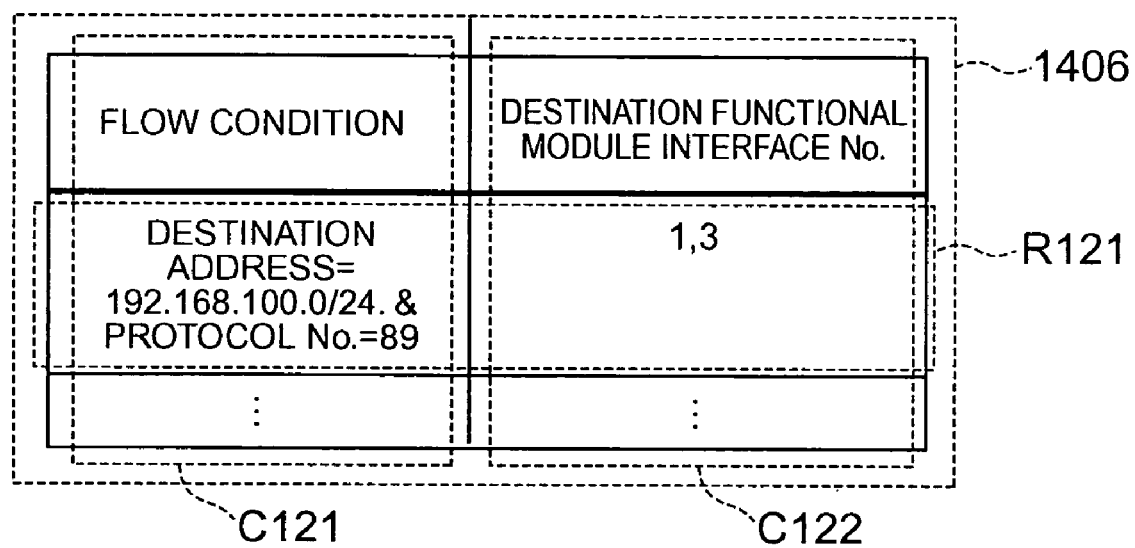
FIG. 16 is a diagram showing a path table in the packet communication device.

FIG. 16 shows the detail of the path table 1203. The path table 1203 comprises a flow condition field C121 and a destination functional module interface No. field C122. For example, in a record R121, the value specified by the flow element 52 of the configuration file 50 is recorded in the flow condition field C121 and the interface numbers of the functional modules to which the action elements 53 and 56 in the configuration file 50 are assigned are recorded in the destination functional module interface No. field C122. The processor 1401 can create the path table 1203, based on the flow condition in the flow processing database 1407, by referencing the functional module database 1404, the processing manner database 1405, and the packet processing assignment database 1406 as necessary. In this example, the destination functional module interface Nos. are stored in the path table 1203 in the order in which the processing is executed. In this example, the destination functional modules (1) and (3) are obtained by referencing path table 1203 shown in FIG. 16.

In addition, the processor 1401 retrieves the network interface, to which the packet is output after the processing of the packet communication device 100, from the ordinary path table 1205 to get information on an output destination network interface (2). Then, the path retrieving unit 120 sends the information, composed of the destination function modules (1) and (3) and the output destination network interface (2), to the network interface (1) 111.

The ordinary path table 1205 used in this case, for example, a table for retrieving an output destination network interface from a packet destination IP address, is similar to the one stored in a conventional standard packet communication device. It is also possible to use a table using not only a destination IP address but also other information in the header such as a destination MAC address. In addition, it is also possible to combine the path table 1203 and the ordinary path table 1205 into one table to allow both the destination functional module and the output destination network interface to be determined at the same time.

When the information composed of the destination functional modules (1) and (3) and the output network interface (2) is received from the path retrieving unit 120, the network interface (1) 111 adds the information to the start of the received packet before sending it to the switch 150. At this time, the information may be added beginning at the start according to the processing order.

The switch 150 checks the start of the received packet to determine where to transfer it. In this case, because the next destination added to the packet is the functional module interface (1), the switch 150 transfers the packet to the functional module interface (1) 131. The functional module interface (1) 131 transfers the packet, received from the switch 150, to the functional module 201.

The processor 2011 of the functional module 201 processes the received packet according to the functional processing program 2014. At this time, if there is a packet that must be sent as a result of processing, it is sent to the functional module interface (1) 131.

The functional module interface (1) 131 transfers the packet, received from the functional module 201, to the switch 150. At this time, the information composed of the destination functional module (3) and the output destination network interface (2) must be added to the packet to be transferred. This may be done by adding the information, stored when the functional module interface (1) 131 received the packet from the switch 150, to the packet received from the functional module 201 or by adding the information, stored when the functional module 201 received the packet from the functional module interface (1) 131, to the packet to be sent to the functional module interface (1) 131. It is also possible to delete its own identification information from the information at the start of the packet so that the information composed of the functional module (1) that will perform the subsequent processing and the output destination network interface (2) are left intact.

The switch 150 checks the start of the received packet to determine where to transfer the packet received from the functional module interface (1) 131. In this case, because the next destination added to the packet is the functional module (3), the switch 150 transfers the packet to the functional module interface (3) 133. The functional module interface (3) 133 transfers the packet, received from the switch 150, to the functional module 203.

The processor 2031 of the functional module 203 processes the received packet according to the functional processing program 2034. At this time, if there is a packet to be sent as the processing result, the processors 2031 sends it to the functional module interface (3) 133.

The functional module interface (3) 133 transfers the packet, received from the functional module 203, to the switch 150. At this time, the information composed of the network interface (2) is added to the transferred packet according to the method described above.

The switch 150 checks the start of the packet, received from the functional module interface (3) 133, and transfers the packet to the network interface (2) 112. The network interface (2) 112 outputs the packet, received from the switch 150, to an output device.

The information on the transfer functional module and the output destination network interface may also be added, not to the start of the packet, but in a predetermined area, to perform the processing described above.

<<Releasing a Module>>

Figure 18:
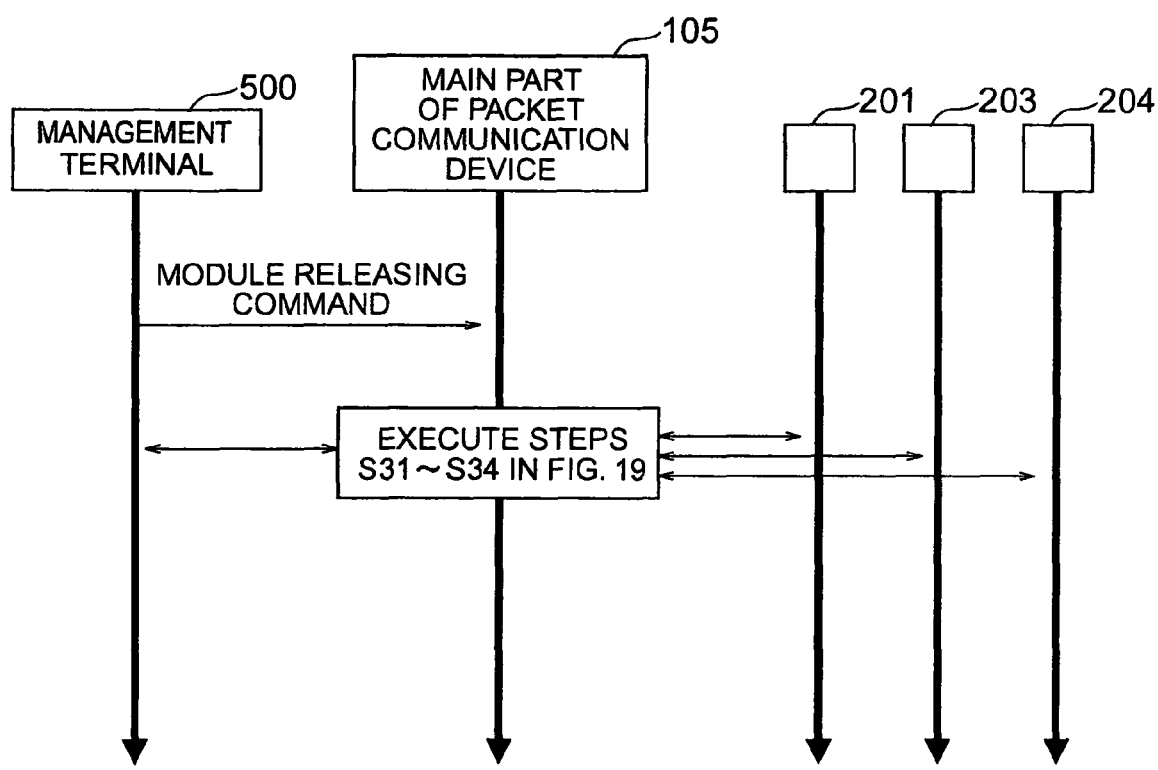
FIG. 18 is a sequence diagram showing the procedure for releasing a module from the packet communication device.

Next, FIG. 18 shows the procedure for releasing all resources of a functional module, assigned to packet processing, and releasing the functional module when the functional module is disconnected from the main part of packet communication device 105.

The manager sends a module releasing command message to the main part of packet communication device 105 via the management terminal 500. The module releasing command message includes the information identifying the functional module to be released, for example, the functional module interface number.

Figure 19:
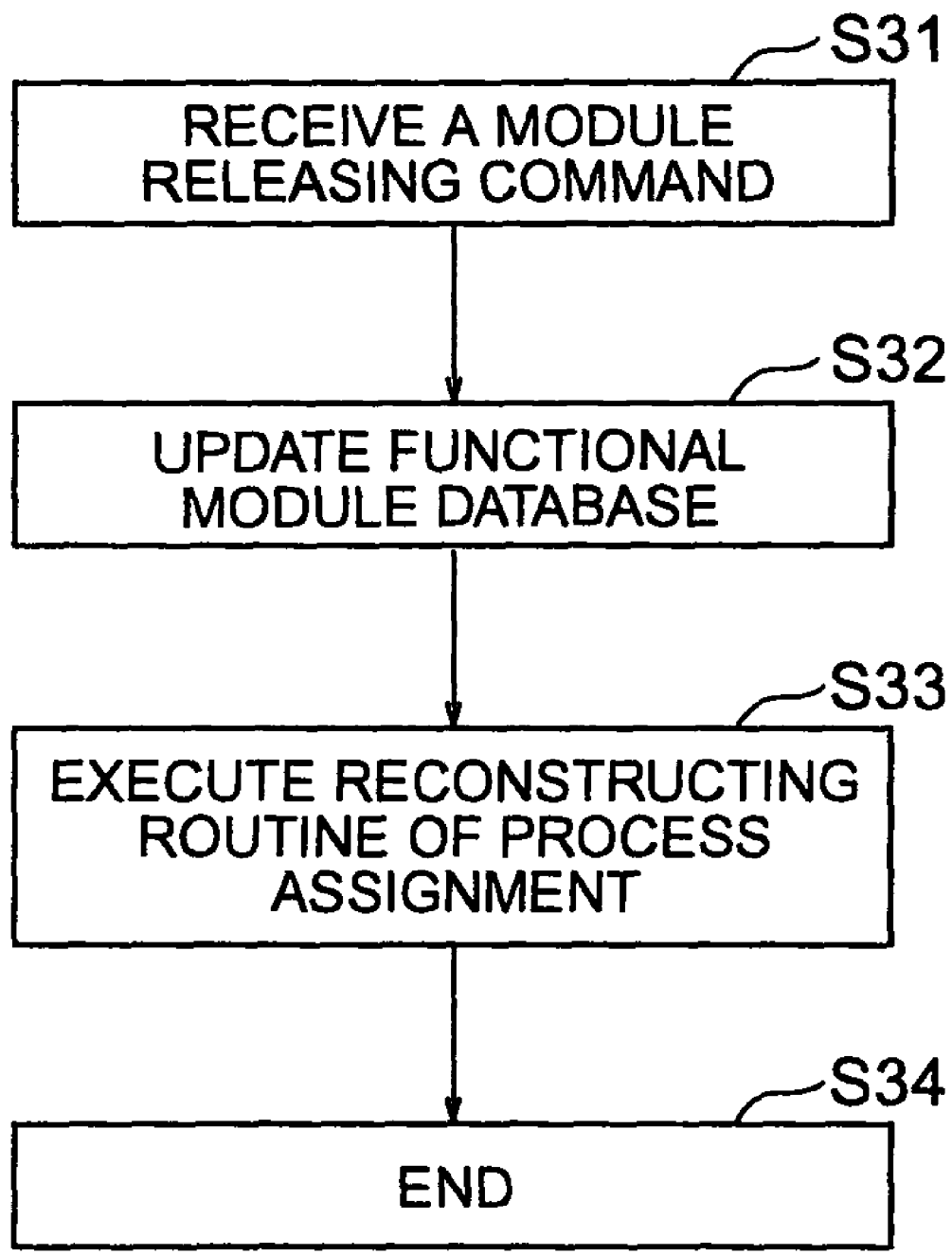
FIG. 19 is a flowchart showing the processing of the configuration processing program when the packet communication device accepts a module releasing command from the management terminal.

Next, with reference to the flowchart in FIG. 19, the following describes the operation of the main part of packet communication device 105 when a module releasing command message is received. The processor 1401 of the module control management unit 140 in the main part of packet communication device 105 performs this processing according to the configuration processing program 1403 that is a program describing the operation described below.

When the main part of packet communication device 105 receives the module releasing command message (S31), the processor 1401 sets the functional module interface number, specified by the message, to the unconnected state (S32). For example, when a module releasing command message specifying the functional module interface number 3 is received, the processor 1401 changes the module identifier in the record R143 in the functional module database 1404 shown in FIG. 5 to "unconnected". After that, the processor 1401 executes the reconstructing routine of process assignment (S33) and ends the operation (S34).

The module releasing command, if executed as described above, causes the reconstructing routine of process assignment to assign the resources of the functional module, which have been assigned for packet processing in the packet communication device 100, to other functional modules. This allows the manager to disconnect the functional module from the main part of packet communication device 105 without affecting the packet processing.

<<Summary>>

The interaction between the main part of packet communication device 105 and the functional modules 201, 203, and 204 described above allows the operation setting to be set up for the functional modules 201, 203, and 204 based on the configuration file 50 created by the manager. Because this embodiment provides means for setting the process content of a functional module without dependence on the function of the functional module and the content that can be set for the functional module, a new functional module can be installed without stopping or updating the configuration processing program 1403.

More specifically, the main part of packet communication device 105 communicates with the functional modules 201, 203, and 204 to acquire the answer of offering necessary for process assignment. Therefore, even if a new functional module is installed and the configuration file 50, which uses the function of the new functional module, is entered from the management terminal 500 to the main part of packet communication device 105, the method described above enables the process assignment to be reconstructed even for the new functional module without changing the configuration processing program 1403.

The present invention is applicable not only to OSI reference model layer 2 or higher layers but also to a packet communication device that performs various types of routing and switching.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A packet communication device that receives a packet over a network and transfers the received packet, comprising:
    a network interface that sends or receives the packet to or from the network;
    a functional module that performs processing of a specific process content for the packet;
    a path retrieving unit that has a path table for obtaining identifiers of said network interface and said functional module and, upon receiving a packet, adds the identifiers, obtained from the path table, to the packet; and
    a module control management unit that stores configuration information, which describes a condition of a packet to which a process is to be applied and a process content for a packet satisfying the condition and, based on the configuration information, finds and stores an identifier of said functional module that can process the process content,
    wherein said module control management unit sends the process content, in part or in whole, to said functional module as an offering message,
    said functional module determines whether or not processing for the process content received from said module control management unit is possible or not and sends an answer of offering to said module control management unit,
    said module control management unit selects a functional module, to which processing of the process content is to be assigned, based on the answer of offering returned by said functional module and requests the selected functional module to set up for processing,
    said module control management unit sends a command to said path retrieving unit so that a packet satisfying the condition is sent to one or more of said selected functional modules according to the process content specified by the configuration information, and
    said path retrieving unit sets the path table according to the command received from said module control management unit so that a packet satisfying the condition is sent to one or more of said selected functional modules according to the process content specified by the configuration information.

2. The packet communication device according to claim 1, further comprising:
    a functional module interface to which said functional module can be connected; and
    a switch that connects said network interface to said functional module interface,
    wherein said path retrieving unit receives a packet via said network interface and, based on a header of the packet, references the path table to find said functional module to which the packet is to be transferred.

3. The packet communication device according to claim 2, wherein said module control management unit is connected to each of said functional module interfaces via an independent line.

4. The packet communication device according to claim 2, wherein said module control management unit is connected to each of said functional module interfaces via a bus.

5. The packet communication device according to claim 1, wherein a plurality of said functional modules are provided,
    the configuration information includes a plurality of process contents for the condition, and
    the path table stores the identifiers of the functional modules in an order in which the process contents are to be processed for the condition.

6. The packet communication device according to claim 1, wherein said module control management unit receives the configuration information from a management terminal or an external device.

7. The packet communication device according to claim 1, wherein said module control management unit serially sends the process content to each of said functional modules.

8. The packet communication device according to claim 1, wherein said module control management unit selects some of the functional modules to which the process content is to be sent and sends the process content only to the selected functional modules.

9. The packet communication device according to claim 1, wherein said module control management unit compares the identifiers acquired in advance from the functional modules with an identifier added to all or some of the process contents in the configuration information to be sent to limit the functional modules to which the process content is to be sent and sends the process content to the limited functional modules.

10. The packet communication device according to claim 9, wherein said module control management unit selects a plurality of functional modules that will perform processing.

11. The packet communication device according to claim 1, wherein said module control management unit sends the process content to the functional modules in broadcasting mode or multicasting mode.

12. The packet communication device according to claim 1, wherein said functional module includes priority information in the answer of offering and sends the answer of offering to said module control management unit and
    said module control management unit selects the functional modules, which will perform processing, based on the priority information included in the answer of offering.

13. The packet communication device according to claim 1,
wherein, if the answers of offering indicate that a plurality of said functional modules are possible to implement the process, said module control management unit notifies the answers of offering to a management terminal and selects the functional module, which will perform processing, based on a selecting result received from said management terminal.

14. The packet communication device according to claim 1,
wherein said module control management unit sends a processing request to said selected functional modules to request the functional modules to perform processing and
upon receiving the processing request, said functional modules prepare for packet processing according to the process content included in the offering message or the process content included in the processing request.

15. The packet communication device according to claim 1,
wherein said functional module comprises storage means for storing the offering message, stores a content of the offering message when the offering message is received, and sets up the functional module based on the content stored in said storage means when the processing request is received.

16. The packet communication device according to claim 1,
wherein said module control management unit selects the functional module, which will perform processing, based on the answer of offering and, when the functional module that will perform processing is determined, stops sending the process content to remaining functional modules.

17. The packet communication device according to claim 1,
wherein a command is sent to said path retrieving unit so that a packet, specified by the condition of a packet in the configuration information corresponding to the offering message, is sent to the functional modules, selected by the module control management unit, with a load and a function distributed according to a procedure specified in the configuration information.

* * * * *